Figure 1:
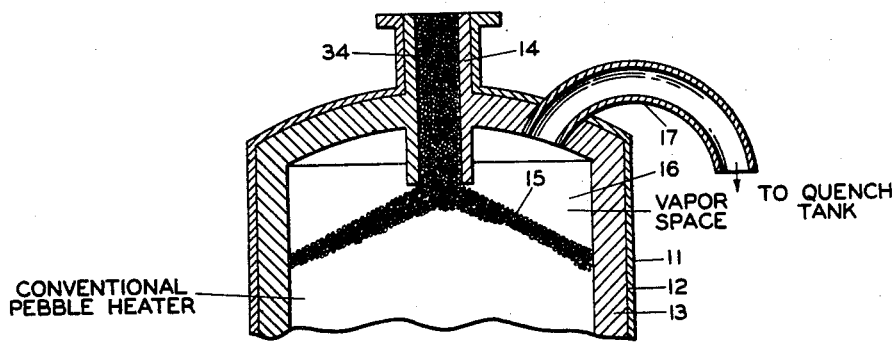

March 14, 1950     S. P. ROBINSON     2,500,870
HYDROCARBON CRACKING PROCESS AND APPARATUS
USING PEBBLE HEATER WITH JET EJECTOR
Filed Sept. 23, 1946

INVENTOR.
S. P. ROBINSON
BY Hudson & Young
ATTORNEYS

Patented Mar. 14, 1950

2,500,870

UNITED STATES PATENT OFFICE 2,500,870

HYDROCARBON CRACKING PROCESS AND APPARATUS USING PEBBLE HEATER WITH JET EJECTOR

Sam P. Robinson, Bartlesville, Okla., assignor to Phillips Petroleum Company, a corporation of Delaware Application September 23, 1946, Serial No. 698,729

2 Claims. (Cl. 196—55)

This invention relates to a process and apparatus for effecting chemical reactions in gas or vapor phase. In a specific embodiment of the invention, it relates to a method of rapidly quenching hot gases and vapors to below reaction temperatures. In another embodiment the invention relates to a method for rapidly removing hot gases and vapors from a conversion chamber.

In cracking hydrocarbons in moving catalyst bed and pebble heater installations, it is conventional to introduce the catalyst and/or pebbles to the reaction chamber through an axially positioned conduit and to remove the reaction gases through a conduit off center. In installations of this type it is necessary that an appreciable vapor space or cushion be maintained above the catalyst or pebble bed. This vapor space is necessary to prevent channeling of vapors through the top side of the pebble bed closest to the outlet. The gases leaving the top of the pebble bed are at their hottest temperature. The surge volume of this vapor space is sufficient to keep the cracked vapors at high temperature for .02 to .10 second. There is still additional surge volume in the outlet duct work leading across the top of the heater to a downcomer leading to conventional quench systems wherein the vapors are usually cooled by water or oil sprays to temperatures of 100 to 150° F. At 1600 to 1900° F. the cracking rates of various hydrocarbon reactions are such that high losses of yield of valuable products occur through secondary reactions. The present invention is concerned with preventing or reducing such losses and thereby improving the yield of desirable hydrocarbons.

It is the purpose of the present invention to more uniformly crack hydrocarbon vapors and to improve the yield of olefins and acetylenes produced. It is also an object of the invention to remove reaction products from the top of a reactor at a faster rate and more uniformly than heretofore. Another object is to cool gases more quickly and more positively. A further object of the invention is to reduce construction cost and lower operating cost in hydrocarbon conversion installations. Other objects of the invention will become apparent from the accompanying disclosure.

This invention provides for more uniform flow of cracked or otherwise treated vapors from the top of a pebble bed. It also provides for more rapid removal and more rapid quenching of said vapors. By withdrawing cracked vapors from multiple openings at the top of the heater instead of from a single opening on one side of the top of the heater, more uniform distribution of vapors through and from the top of the pebble bed is obtained. By placing these openings at points such that each takes a proportionate share of the vapors egressing from the top of the bed the deviation of vapor velocities from a given predetermined average will be so decreased that the need for a deep vapor pocket above the pebble level will be substantially eliminated. By materially reducing this retention time in the top of the pebble heater, yield of the various olefins and acetylenes is substantially increased.

The invention also provides high velocity ejectors to remove the gases or vapors from above the pebble bed. With such ejectors or aspirators the final vapor pressure of cracked products above the pebble level can be reduced to give higher yields of olefins and acetylenes at lower pressures and still more rapidly remove these vapors from the reactor. In pebble heater designs previously used the pressure differential between the vapor space in the top of the heater and the quench tank has been utilized to cause flow of vapors between these two points. Use of the ejectors according to the invention reduces the final vapor pressure of cracked products above the pebble level and in this manner increases yield and lowers the feed pressure required and compression cost of the feed.

Since the gases have to be quickly and positively cooled or quenched to maintain a high yield of olefins and acetylenes an ejector or inspirator mounted on top of the pebble chamber accomplishes this faster than conventional means. The ejectors utilize a nozzle opening into a Venturi tube. Upon passing a high velocity jet of water, steam, or other inert fluid through the Venturi tube, a rapid ejection or aspiration of gas from the reactor is accomplished. Water is the most effective aspirating fluid because of its cooling effects. If water is used it will cool the gases faster if the surface is increased by atomization. Commercial water-fog atomizing nozzles produce finely atomized and high velocity water particles and can be used to advantage for aspirating the vapors. The high velocity water-fog stream's effect on aspiration will be augmented by the cooling and resulting contraction taking place in the mixed water-vapor stream. Because of the large volume of water required anyway to cool the gases, if all of it is used in the jet aspirators, these aspirator-coolers will be very efficient.

A further refinement of ejector-quenching is obtained by aspirating the effluent hydrocarbons with a jet of superheated water (under pressure) with concomitant immediate vaporization and instant cooling effect on the hydrocarbon stream. Other hot liquids which have no detrimental effect upon the hydrocarbons may be utilized, also.

With efficient cooling the vapor-water mixture may then be directly introduced to carbon steel piping leading to a separator for removal of cool vapors from the water. High priced alloy steel duct work and quench tank are thus unnecessary to the process.

The term pebble as referred to throughout the specification is defined as any particulate refractory contact material which is readily flowable through a contact chamber. Pebbles are preferably spherical and from about ⅛ inch to 1 inch in size but spheres ranging in size from about ¼ inch to ½ inch are the most practical. Uniform shapes and sizes are preferred but pebbles of irregular shape and size may be used. Pebbles may be made of ceramic material, such as alumina, or of metals and alloys, such as iron, nickel, Monel and inconel.

While the invention has its greatest applicability in the cracking of hydrocarbons it is not so limited. The invention is applicable to any process which requires rapid removal of gases or vapors from a reaction chamber and/or rapid quenching of these vapors.

For a more complete understanding of the invention reference may be had to the drawing of which Figure 1 is an elevational view in section of the upper section of a conventional pebble heater reactor.

Figure 2:
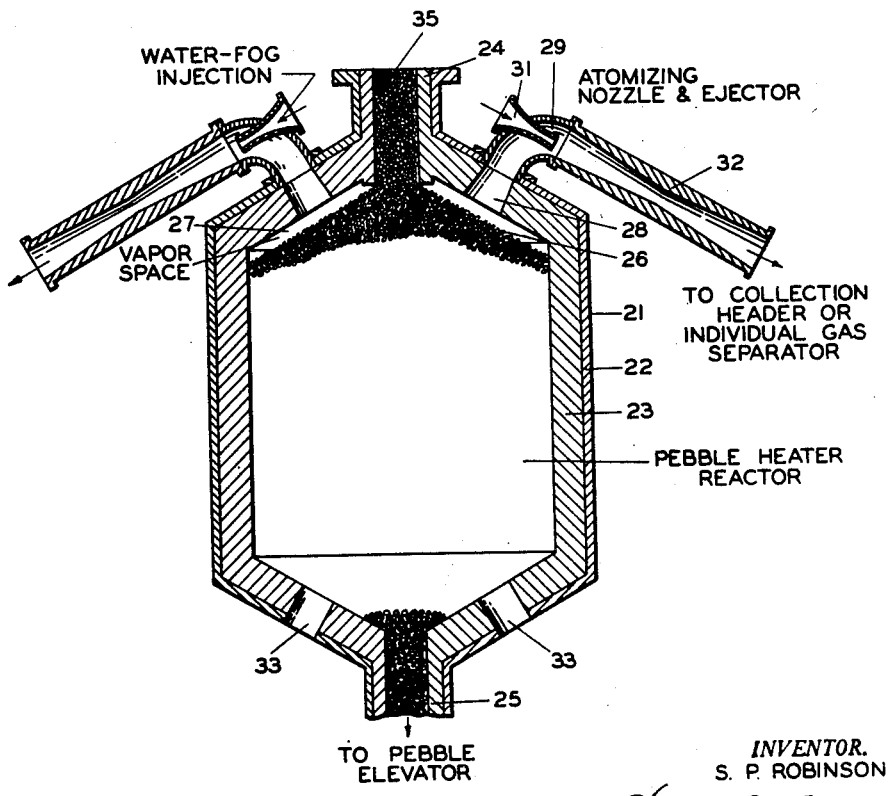

Figure 2 is a sectional elevation of a preferred arrangement of apparatus according to the invention.

Referring in more detail to Figure 1, chamber 11 is a typical pebble heater reaction chamber having a metal shell 12 and an insulating and refractory lining 13. A throat or neck 14 admits a column of pebbles 34 which forms a bed within the reactor having a top surface 15. Neck 14 extends within the reactor a substantial distance and provides vapor space 16. In a cracking process as reactants rise through the pebble bed they are heated by the hot pebbles and brought to cracking temperature. The cracked vapors collect in vapor space 16 and pass out through conduit 17 to a quench tank not shown. The large surge volume of vapor space 16 and conduit 17 unduly prolong the high temperature condition of the cracked vapors which results in undesirable side reactions and decreases the yield of desired products.

Figure 2 shows a pebble heater reactor 21 having a shell 22 and an insulating and refractory lining 23. A neck or throat 24 serves as a pebble inlet and refractory-lined conduit 25 serves as a pebble outlet. A series of openings 33 in the bottom of reactor 21 serve as feed distributing inlets. Screening means, not shown, must be provided over these inlets to prevent plugging with pebbles. Pebbles 35 entering throat 24 substantially fill the reaction space and form a conical top surface 26. Vapor space 27 is considerably smaller in volume than is conventional. A series of outlets 28 in the conical top of the reactor lead into refractory elbows 29 which are pierced by atomizing nozzles 31. Atomizing nozzles 31 are positioned to throw jets of fluid through Venturi tubes 32.

Outlets 28 are positioned so that each takes a proportionate share of the outgoing vapors. Any number of outlets may be utilized but of course better results are obtained with a plurality. The preferred embodiment utilizes four outlets positioned 90 degrees apart on a circle concentric with the pebble inlet. The ejector assembly comprising elbow 29, nozzle 31, and Venturi tube 32 must be constructed of highly refractory material which will withstand considerable temperature shock. High temperature alloys and alloys coated with refractory material are suitable for the purpose. Atomizing nozzle 31 should be placed so that its mouth is out of the line of sight of pebbles in the pebble bed. This will avoid heat losses due to radiation to a relatively cold fluid in the Venturi tube.

In a typical hydrocarbon cracking operation pebbles are heated in a chamber (not shown) positioned directly above conversion chamber 21 by contact with hot combustion gas. A contiguous stream of these hot pebbles at a temperature of the order of 1500 to 3000° F. descends into the pebble heater 21 through throat 24, passing through the cracking chamber and into outlet 25. The pebbles then pass to an elevator (not shown) which elevates them to the upper chamber where they are again heated and passed through the reactor. Simultaneously with the passing of hot pebbles through the cracking zone, a desirable hydrocarbon feed is passed through a series of inlets 33 in the conical bottom of the conversion chamber and as the feed stock passes upwardly through the descending pebbles, it is quickly heated to cracking temperature and cracked a predetermined amount. The cracked vapors are very uniformly withdrawn from the top of the pebble bed through outlets 28 by the sucking action of the ejector assembly produced by the high velocity injection of water-fog through atomizing nozzle 31. The mixture of cracked hydrocarbon vapors and/or liquids, and water vapor and/or water passes from Venturi tube 32 to a collection header or an individual gas separator.

While the use of water as a quenching fluid is preferred other fluids may be used such as steam, hydrocarbons, and inert liquids and gases generally. Water injected in the form of a true water-fog is considerably more efficient than a common water spray; however, the injection of an ordinary water spray is productive of desirable results. In a true water-fog, water is so finely dispersed as to approach a colloidal suspension of water in a gas. This extremely fine dispersion of water provides infinitely greater surface contact with the gases to be quenched than a water spray of relatively coarse drops and consequently produces extremely rapid quenching.

In a true water-fog at least 25% by weight of the total water sprayed is divided into droplets or particles of 25 microns or less in diameter. In more efficient water-fog sprays at least 25% by weight of the total water is divided into particles of 10 microns and less in diameter. Water-fog sprays are produced by pressure atomizing nozzles which usually direct the flow of liquid at high pressure against a plate or similar element inside the nozzle so as to break the stream into extremely minute droplets by impingement. Any spray nozzle capable of delivering a high velocity water-fog, i. e., spray of water particles in which at least about 25 per cent by weight of the total water sprayed is divided into droplets of less than about 25 microns in diameter, will satisfy the requirements of the invention. A "water-fog" nozzle, as the term is used herein, must deliver a "water-fog" as defined above. Such nozzles are available commercially.

To illustrate the distinction between a true water-fog and an ordinary spray of water the following tables are presented:

TABLE I

[Drop-size characteristics produced by hollow-cone type nozzle]

| Nominal drop diameter, microns | Percent by weight (calculated) | No. $H_2O$ fog particles per lb. $H_2O$ | Surface area, sq. ft. per lb. of $H_2O$ |
|---|---|---|---|
| 10 | 0.0 (.04) | | |
| 25 | 0.3 | $166 \times 10^6$ | 3.5 |
| 50 | 2.0 | $139 \times 10^6$ | 11.7 |
| 100 | 5.0 | $43 \times 10^6$ | 14.7 |
| 150 | 8.7 | $23 \times 10^6$ | 17.3 |
| 200 | 15.3 | $17 \times 10^6$ | 22.4 |
| 300 | 21.6 | $7 \times 10^6$ | 21.2 |
| 400 | 13.0 | $2 \times 10^6$ | 9.5 |
| 500 | 12.5 | | 7.3 |
| 600 | 21.6 | | 10.6 |
| | 100.0 | $397 \times 10^6$ | 118.2 |

Operating pressure—50 lbs./in.$^2$
Type spray head—.063 in. orifice diameter hollow cone.

The nominal diameter is the mid-diameter of a drop group which includes a finite range of sizes. The 25 group includes drops from 17.5 to 37.5 microns, the 50 group contains drops from 37.5 to 75 microns, etc.

TABLE II

[Drop-size characteristics of super water-fog type spray]

| Nominal diameter of fog particles, microns | Percent by weight of total Water | Number of Water fog particles per lb. $H_2O$ | Surface area, sq. ft. per lb. $H_2O$ |
|---|---|---|---|
| 1 (and under) | 3.3 | $2,970 \times 10^{10}$ | 970 |
| 2 | 6.3 | $687 \times 10^{10}$ | 920 |
| 5 | 42.0 | $291 \times 10^{10}$ | 2,470 |
| 10 | 20.2 | $18 \times 10^{10}$ | 590 |
| 15–100 (25 ave.) | 28.2 | $2 \times 10^{10}$ | 350 |
| | 100.0 | $3,960 \times 10^{10}$ | 5,300 |

Operating pressure—100 lbs./in.$^2$
Type of nozzle—high pressure water-fog.
Water stream temperature—200° F.

In attempting to quench and cool hot cracked gases uniformly and thoroughly to temperatures below 500° F. it is quite desirable to get good mixing and fast evaporation of the cooling or quenching water. The number of individual particles into which the cooling water stream is divided directly affects the ease of mixing of gases and water particles. The greater the exposed surface and the lower the mass of the water particles, the easier the conversion of water to steam and the cooling of the gases from which this latent heat of evaporation must be extracted will take place.

Tables I and II vividly illustrate the difference in results that may be obtained. The finely comminuted water fog spray in Table II has 100,000 times as many water particles for intimate mixing with and for cooling the hot gases uniformly as the conventional spray of Table I. In addition it has 45 times the surface area for heat transfer and evaporative cooling. Moreover, preheating this shower water under pressure allows its ready flashing and evaporation from uniformly dispersed minute particles of water.

The use of a nozzle which will project the water fog stream 40 to 50 feet under unimpeded conditions at 100 lbs. nozzle pressure will assure aspiration of hot gases from chambers and their almost perfect mixing in a Venturi tube mixing throat.

The effect of smaller sized particles on the breaking up of the cooling water stream and increasing the evaporative surface area is shown in Table III where a relatively small particle for common spray type showers of 100 microns in diameter is taken as unity. (It will be noted in Table I that average particle size is approximately 200 microns in diameter.)

TABLE III

[Comparison of drop-size, drop-number, and drop-area for a given unit weight of $H_2O$]

| Diameter of Drop, Microns | Ratios Number/unit weight | Ratios Surface area/unit weight |
|---|---|---|
| 0.5 | 8,000,000 | 200 |
| 1.0 | 1,000,000 | 100 |
| 2 | 125,000 | 50 |
| 5 | 8,000 | 20 |
| 10 | 1,000 | 10 |
| 25 | 64 | 4 |
| 50 | 8 | 2 |
| 100 | 1 | 1 |

The following examples illustrate the advantage of the invention in cracking propane.

CRACKING PROPANE TO ETHYLENE AT 1625° F.

*Example I*

A feed consisting of 500 lbs. of $C_3H_8$/hr./ft.$^2$ is brought to a temperature of 1625° F. in a pebble heater reactor of 5 ft. diameter and having a space of an average of 4 in. between the pebble bed and the dome of the reactor. The contact time in the bed is 0.09 sec. and 90% cracking is effected in the bed. Cracked gases at the rate of 194 ft.$^3$/sec. leave the pebble bed and are taken off through six ejectors and quenched with a jet of water-fog under 100 lbs./in.$^2$ pressure at a distance of 18 in. from the reactor. The volume of the space above the pebble bed plus the volume of take-off lines before the quench amounts to 7.36 ft.$^3$ Hence, the retention time of the cracked gases at high temperature is about 0.04 sec. This gives a total cracking time of .13 sec. and about 98% cracking as compared to 90%, originally.

The final product has the following composition by weight per cent:

| | Per cent |
|---|---|
| $H_2$ | 2.00 |
| $CH_4$ | 27.55 |
| $C_2H_4$ | 44.86 |
| $C_2H_6$ | 4.33 |
| $C_3H_6$ | 6.80 |
| $C_3H_8$ | 1.97 |
| $C_4H_8$ | 4.08 |
| $C_4H_{10}$ | 0.16 |
| Heavier | 8.25 |
| | 100.00 |

*Example II*

Utilizing comparable feed and operating conditions to those of Example I, but conducting the cracking operation in a conventional pebble heater reactor having a 12 in. average space between the pebble bed and the dome of the reactor and a single product outlet of 10 in. diameter by 9 ft. in length between the reactor and the quench tank, a retention time of the cracked gases at 1625° F. of 0.13 sec. is effected. The volume of the space above the pebble bed plus the volume of the take-off line amounts to approximately 25 ft.$^3$ which accounts for the relatively large added retention time before quenching. With an initial cracking time of 0.09 sec. the total cracking time is 0.22 sec. and effects more than 99.5% cracking of $C_3H_8$.

The final product has the following composition by weight percent:

| | Per cent |
|---|---|
| $H_2$ | 2.6 |
| $CH_4$ | 28.8 |
| $C_2H_4$ | 34.8 |
| $C_2H_6$ | 4.8 |
| $C_3H_6$ | 4.2 |
| $C_3H_8$ | -- |
| $C_4H_8$ | 2.9 |
| $C_4H_{10}$ | -- |
| Heavier | 21.9 |
| | 100.0 |

It will be noted that ethylene production has decreased approximately 20% (from 44.86% to 34.8%) probably because of tar and carbon formation, polymerization, and rehydrogenation (Note increase in ethane concentration in spite of greater cracking). The rehydrogenation is directly traceable to inefficient cooling in the ranges of temperature from 1000° to 1500° F.

If the pebble heater in Example II had been designed for lower percentage cracking in the bed, entirely too much heat load would have been placed on the reaction space above the pebble bed; the heat transfer rate would not have been sufficient from the relatively small surface of pebbles on the top of the bed; the endothermic reaction would have dropped the temperature of the gases excessively with resulting ethylene production reduced by incomplete reaction; and a high degree of polymerization of olefins formed and excessive rehydrogenation of the ethylene formed would have occurred in the long retention time within which ethylene and hydrogen exist in the falling temperature range of 1500°–1000° F.

The main purpose of the water-fog sprays or flashed high pressure hot water is to insure minimum coexistence of ethylene and hydrogen in the temperature range of 1500°–1000° F. Heat transfer (and cooling ethylene) is accelerated by large surface of water particles and/or flash evaporation thereof.

CRACKING PROPANE TO ETHYLENE + ACETYLENE AT 2200° F.

*Example III*

In this and the following example, steam dilution of the feed to give a hydrocarbon partial pressure of 100 mm. is effected. The steam + propane feed is subjected to cracking at 2200° F. in a pebble heater reactor, having the same vapor space as that of Example I and designed for a reaction time of 0.02 sec., at a feed rate of 500 lbs./hr./ft.$^2$ (steam + HC). For 500 lbs./hr./ft.$^2$ total feed, there are 24.1 mols/hr. of steam and 4.2 mols/hr. of hydrocarbons or a total of 28.3 mols/hr. of effluent gas. The total volume of gases leaving the pebble bed is 305 ft.$^3$/sec., resulting in a retention time for the cracked gases of 0.024 sec. and a total cracking time of approximately 0.04 sec.±.

The product contains 55 volumes of $C_2H_4$ per 100 volumes of $C_3H_8$ feed, 23 volumes of $C_2H_2$ per 100 volumes of $C_3H_8$ feed, and 15 lbs. of carbon + tar per 100 lbs. of carbon in the feed.

*Example IV*

A feed comparable to that processed in Example III is fed into a pebble heater reactor having the same vapor space as the reactor in Example II and otherwise designed like the reactor of Example III.

The retention time of the cracked gases before the quench amounts to 0.082 sec., giving a total cracking time of approximately 0.10 sec. (If the propane is substantially cracked in 0.02 sec., the decomposition reactions are approximately isothermal and reaction time is considered to be approximately 0.10 sec. before quenching.)

The product from this reaction contains 45 volumes of $C_2H_4$ per 100 volumes of $C_3H_8$ feed, 23 volumes of $C_2H_2$ per 100 volumes of $C_3H_8$ feed, and 25 lbs. carbon + tar per 100 lbs. of carbon in the feed.

It can readily be seen that a loss of 10 volumes of ethylene yield per 100 volumes of feed is suffered in the process of Example IV as compared to Example III or a reduction of about 18% in the ethylene yield. The loss to carbon and tar has risen by about 65% without producing any more acetylene.

Various modifications of the invention not described will become apparent to those skilled in the art. The illustrative details disclosed are not to be construed as imposing unnecessary limitations on the invention.

I claim:

1. Apparatus for effecting chemical reactions in gas or vapor phase at elevated temperatures comprising in combination a substantially vertical cylindrical reaction chamber having a convex conical bottom and a convex conical top; conduit means for introducing pebbles through the apex of said conical top extending into said chamber a short distance so as to cooperate with a gravitating contiguous bed of pebbles passing through said chamber via said conduit means and with said top so as to form a vapor space between said top and said bed of pebbles having a maximum average depth of $1/15$ of the chamber diameter; means for removing pebbles from the bottom of said conical bottom; gas or vapor inlet means communicating with the lower portion of said chamber; a plurality of gas or vapor outlets in said conical top positioned substantially concentrically and uniformly around said pebble inlet; and a plurality of ejector means positioned adjacent and in communication with each of said gas or vapor outlets, each comprising a Venturi tube and a water-fog nozzle arranged to increase the flow of gas or vapor out of said reaction chamber when a water-fog jet is introduced through said nozzle.

2. A process for cracking hydrocarbons which comprises gravitating a contiguous stream of hot pebbles at a temperature above a predetermined cracking temperature through a relatively narrow inlet extending into an enclosed cylindrical cracking zone a short distance so as to form a compace bed of pebbles having a slanting top surface and a vapor space in the upper portion of said enclosed zone having a maximum average depth of $1/15$ of the diameter of said cracking zone; continuously withdrawing pebbles from the bottom of said cracking zone; continuously passing a suitable hydrocarbon stream in vapor form upwardly through said cracking zone in contact with said hot pebbles so as to crack at least a portion of said hydrocarbon stream; continuously collecting the cracked effluent in said vapor space; continuously ejecting and quenching the cracked effluent in a Venturi tube-shaped zone communicating with said vapor space and exterior thereto by injecting a high velocity of concurrent stream of water-fog into said cracked effluent so as to reduce the temperature of said effluent to below reaction temperature, the dispersion in said water-fog being such that at least 25 weight per cent of the water therein is in droplets of less than 25 microns diameter; and recovering cracked hydrocarbon from the effluent.

SAM P. ROBINSON.

REFERENCES CITED

The following references are of record in the file of this patent:

UNITED STATES PATENTS

| Number | Name | Date |
|---|---|---|
| 990,009 | Richards | Apr. 18, 1911 |
| 1,077,771 | Waggoner | Nov. 4, 1913 |
| 1,763,604 | Harnsberger | June 10, 1930 |
| 1,853,753 | Wagner | Apr. 12, 1932 |
| 2,093,588 | Forward | Sept. 21, 1937 |
| 2,147,399 | Borden | Feb. 14, 1939 |
| 2,191,864 | Schaefer | Feb. 27, 1940 |
| 2,405,395 | Bahlke et al. | Aug. 6, 1946 |
| 2,406,640 | Siecke | Aug. 27, 1946 |
| 2,409,780 | Mekler | Oct. 22, 1946 |
| 2,437,383 | Dalton | Mar. 9, 1948 |
| 2,439,730 | Happel | Apr. 13, 1948 |

FOREIGN PATENTS

| Number | Country | Date |
|---|---|---|
| 604,514 | France | Jan. 29, 1926 |

Certificate of Correction

Patent No. 2,500,870 March 14, 1950

SAM P. ROBINSON

It is hereby certified that errors appear in the printed specification of the above numbered patent requiring correction as follows:

Column 5, line 28, insert quotation marks before and after the numeral "25"; line 29, insert quotation marks before and after "50"; column 8, line 65, for "compace" read *compact*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*